United States Patent
Méler et al.

(10) Patent No.: US 9,973,695 B1
(45) Date of Patent: May 15, 2018

(54) SYSTEMS AND METHODS FOR CAPTURING STITCHED VISUAL CONTENT

(71) Applicant: GOPRO, INC., San Mateo, CA (US)

(72) Inventors: Antoine Méler, Chapareillan (FR); Martin Arnoux, Challes les eaux (FR)

(73) Assignee: GoPro, Inc., San Mateo, CA (US)

( * ) Notice: Subject to any disclaimer, the term of this patent is extended or adjusted under 35 U.S.C. 154(b) by 118 days.

(21) Appl. No.: 15/223,319

(22) Filed: Jul. 29, 2016

(51) Int. Cl.
  *H04N 5/232* (2006.01)
  *H04N 5/235* (2006.01)
  *H04N 5/247* (2006.01)

(52) U.S. Cl.
  CPC ....... *H04N 5/23238* (2013.01); *H04N 5/2353* (2013.01); *H04N 5/247* (2013.01)

(58) Field of Classification Search
  CPC ... H04N 5/23238; H04N 5/2353; H04N 5/247
  USPC .......................................................... 348/38
  See application file for complete search history.

(56) References Cited

U.S. PATENT DOCUMENTS

| | | | |
|---|---|---|---|
| 6,243,099 B1 | 6/2001 | Oxaal | |
| 9,264,598 B1 | 2/2016 | Baldwin | |
| 9,609,212 B2 | 3/2017 | Takenaka | |
| 2008/0074500 A1 | 3/2008 | Chen | |
| 2009/0010567 A1 | 1/2009 | Akiba | |
| 2010/0097444 A1 | 4/2010 | Lablans | |
| 2011/0063421 A1 | 3/2011 | Kubota | |
| 2011/0115806 A1 | 5/2011 | Rogers | |
| 2011/0168475 A1 | 7/2011 | Moser | |
| 2011/0249001 A1 | 10/2011 | Kameyama | |
| 2011/0255802 A1 | 10/2011 | Kameyama | |
| 2013/0013185 A1 | 1/2013 | Smitherman | |
| 2013/0100132 A1 | 4/2013 | Katayama | |
| 2015/0173715 A1 | 6/2015 | Raghavan | |

*Primary Examiner* — Nguyen Truong
(74) *Attorney, Agent, or Firm* — Sheppard Mullin Richter & Hampton LLP

(57) ABSTRACT

A first image sensor may generate images capturing a first portion of a capture field. The capture of images by the first image sensor may be characterized by a first rolling shutter direction. A second image sensor may generate images capturing a second portion of the capture field. The capture of images by the second image sensor may be characterized by a second rolling shutter direction. The first portion may be adjacent to the second portion. The first rolling shutter direction may be parallel to and the same as the second rolling shutter direction. A first image may be obtained from the first image sensor. A second image may be obtained from the second image sensor. A stitched image may be generated based on the first image and the second image.

20 Claims, 18 Drawing Sheets

SYSTEMS AND METHODS FOR CAPTURING STITCHED VISUAL CONTENT

FIELD

This disclosure relates to systems and methods that captures stitched visual content.

BACKGROUND

Images captured from multiple cameras may be stitched together to generate a panoramic image. The images captured by the cameras may be characterized by rolling shutter effects. Misalignment of rolling shutter directions between the cameras may result in misalignment of captured visuals within images for stitching.

SUMMARY

This disclosure relates to capturing stitched visual content. A set of image sensors may generate visual output signals conveying visual information within a capture field. The set of image sensors may include a first image sensor and a second image sensor. The first image sensor may generate images capturing a first portion of the capture field. The capture of images by the first image sensor may be characterized by a first rolling shutter direction. The second image sensor may generate images capturing a second portion of the capture field. The capture of images by the second image sensor may be characterized by a second rolling shutter direction. The first portion may be adjacent to the second portion. The first rolling shutter direction may be parallel to and the same as the second rolling shutter direction. A first image may be obtained from the first image sensor. A second image may be obtained from the second image sensor. A stitched image may be generated based on the first image and the second image.

A system that captures stitched visual content may include one or more of a set of image sensors, a physical processor, and/or other components. Visual content may refer to media content that may be observed visually. Visual content may include one or more of an image, a sequence of images, a frame of a video, a video, and/or other visual content. Visual content may be captured through the use of one or more cameras/image sensors. The captured images/videos may be stitched together to form the stitched visual content.

In some implementations, stitched visual content may include stitched spherical visual content. Spherical visual content may refer to visual content including multiple views from a location. Spherical visual content may include visual content obtained by a spherical capture. Stitched Spherical visual content may include a full spherical visual capture (360 degrees of capture) or a partial spherical visual capture (less than 360 degrees of capture). In some implementations, stitched visual content may include inverse visual content. Inverse visual content may refer to visual content including multiple views of a location/object. In some implementations, stitched visual content may include a three-dimensional reconstruction of a location.

A set of image sensors may be configured to generate visual output signals conveying visual information within a capture field. In some implementations, the capture field may include a spherical field of view around the set of image sensors. The capture field may include one or more portions. The capture field may include a first portion, a second portion, and/or other portions. The first portion of the capture field may be adjacent to the second portion of the capture field. The first portion of the capture field may include a first boundary portion and the second portion of the capture field may include a second boundary portion. The first boundary portion may be adjacent to the second boundary portion and/or other boundary portions. In some implementations, the first portion may adjacent to the second portion based on a right part of the first portion being adjacent to a left part of the second portion. In some implementations, the first portion may be further adjacent to the second portion based on a top part of the first portion being adjacent to a top part of the second portion.

In some implementations, the capture field may include a third portion. The third portion of the capture field may be adjacent to the first portion of the capture field and diagonal to the second portion of the capture field. The first portion of the capture field may include a third boundary portion and the third portion of the capture field may include a fourth boundary portion. The third boundary portion may be adjacent to the fourth boundary portion and/or other boundary portions. In some implementations, the third portion may be adjacent to the first portion based on a top part of the third portion being adjacent to a bottom part of the first portion.

In some implementations, one or more portions of the capture field may overlap with one or more other portions of the capture field. In some implementations, the first portion of the capture field may overlap with the second portion of the capture field, and/or other portions of the capture field.

The set of image sensors may include two or more image sensors, and/or other components. The set of image sensors may include a first image sensor, a second image sensor, and/or other image sensors. In some implementations, the set of image sensors may include a third image sensor. In some implementations, the set of image sensors may include eight image sensors. In some implementations, the set of image sensors may include ten image sensors.

The set of image sensors may include one or more of a charge-coupled device sensor, an active pixel sensor, a complementary metal-oxide semiconductor sensor, an N-type metal-oxide-semiconductor sensor, and/or other image sensors. One or more optical elements may be configured to guide light to the set of image sensors. Optical components may refer to components that directly and/or indirectly guide light onto the set of image sensors. Optical components may include one or more of a lens, a mirror, a prism, and/or other optical components.

The first image sensor may be configured to generate first visual output signals conveying first visual information within the first portion of the capture field. The first image sensor may include a first array of photosites and/or other photosites. The first image sensor may have a first edge and a second edge that is opposite of the first edge. The first array of photosites may have a first set of rows arrayed between the first edge and the second edge. The first set of rows may include a first row adjacent to a second row and a third row adjacent to the second row. The first visual output signals conveying the first visual information within the first portion of the capture field may be generated based on light incident on the first array of photosites and/or other information. The first image sensor may generate the first visual output signals sequentially across the first set of rows such that the first visual output signals are generated row by row from the first edge to the second edge.

The sequential generation of the first visual output signals may cause the first visual information to be defined by the light incident on the first array of photosites at different times. The sequential generation of the first visual output signals may define a first rolling shutter direction for the first portion of the capture field. The first rolling shutter direction may indicate a first direction in which the first visual information is defined across the first portion as a function of time.

The second image sensor may be configured to generate second visual output signals conveying second visual information within the second portion of the capture field. The second image sensor may include a second array of photosites and/or other photosites. The second image sensor may have a third edge and a fourth edge that is opposite of the third edge. The second array of photosites may have a second set of rows arrayed between the third edge and the fourth edge. The second set of rows may include a fourth row adjacent to a fifth row and a sixth row adjacent to the fifth row. The second visual output signals conveying the second visual information within the second portion of the capture field may be generated based on light incident on the second array of photosites and/or other information. The second image sensor may generate the second visual output signals sequentially across the second set of rows such that the second visual output signals are generated row by row from the third edge to the fourth edge.

The sequential generation of the second visual output signals may cause the second visual information to be defined by the light incident on the second array of photosites at different times. The sequential generation of the second visual output signals may define a second rolling shutter direction for the second portion of the capture field. The second rolling shutter direction may indicate a second direction in which the second visual information is defined across the second portion as the function of time. The second rolling shutter direction may be parallel to and the same as the first rolling shutter direction. In some implementations, the first rolling shutter direction may be parallel to and same as the second rolling shutter direction along a first boundary between the right part of the first portion and the left part of the second portion. In some implementations, the first rolling shutter direction may be opposite of the second rolling shutter direction along a second boundary between the top part of the first portion and the top part of the second portion.

In some implementations, the sequential generation of the first visual output signals and the sequential generation of the second visual output signals may be synchronized in time. The sequential generations of the first visual output signals and the second visual output signals may be synchronized such that the first visual information within the first boundary portion and the second visual information within the second boundary portion are defined at one or more same moments in time.

The third image sensor may be configured to generate third visual output signals conveying third visual information within the third portion of the capture field. The third image sensor may include a third array of photosites and/or other photosites. The third image sensor may have a fifth edge and a sixth edge that is opposite of the fifth edge. The third array of photosites may have a third set of rows arrayed between the fifth edge and the sixth edge. The third set of rows may include a seventh row adjacent to an eight row and a ninth row adjacent to the eight row. The third visual output signals conveying the third visual information within the third portion of the capture field may be generated based on light incident on the third array of photosites and/or other information. The third image sensor may generate the third visual output signals sequentially across the third set of rows such that the third visual output signals are generated row by row from the fifth edge to the sixth edge.

The sequential generation of the third visual output signals may cause the third visual information to be defined by the light incident on the third array of photosites at different times. The sequential generation of the third visual output signals may define a third rolling shutter direction for the third portion of the capture field. The third rolling shutter direction may indicate a third direction in which the third visual information is defined across the third portion as the function of time. The third rolling shutter direction may be opposite of the first rolling shutter direction. In some implementations, the third rolling shutter direction may be opposite of the first rolling shutter direction along a third boundary between the top part of the third portion and the bottom part of the first portion.

In some implementations, the sequential generation of the first visual output signals and the sequential generation of the third visual output signals may be synchronized in time. The sequential generations of the first visual output signals and the third visual output signals may be synchronized such that the first visual information within the third boundary portion and the third visual information within the fourth boundary portion are defined at one or more same moments in time.

The physical processor(s) may be configured by machine-readable instructions. Executing the machine-readable instructions may cause the physical processor(s) to facilitate capturing stitched visual content. The machine-readable instructions may include one or more computer program components. Computer program components may include one or more of a imaging component, a stitching component, and/or other computer program components.

The imaging component may be configured to obtain one or more images based on one or more visual information and/or other information. The imaging component may obtain a first image based on the first visual information and/or other information. The imaging component may obtain a second image based on the second visual information and/or other information. The imaging component may obtain a third image based on the third visual information and/or other information.

The stitching component may be configured to generate one or more stitched images. The stitched image(s) may be generated based on one or more images and/or other information. The stitching component may generate a stitched image based on the first image, the second image, and/or other information. In some implementations, the stitching component may generate the stitched image further based on the third image.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
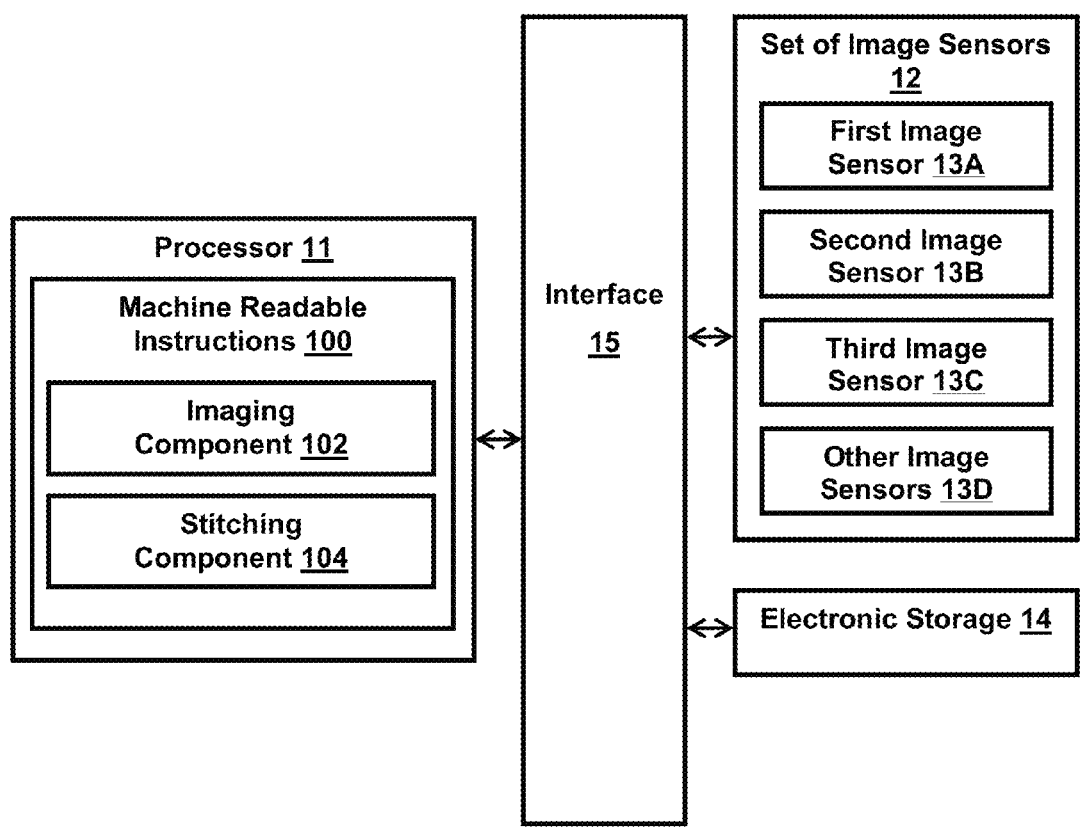
FIG. 1 illustrates a system for capturing stitched visual content.

FIG. 1 illustrates system 10 for capturing stitched visual content. System 10 may include one or more of processor 11, set of image sensors 12 (including first image sensor 13A, second image sensor 13B, third image sensor 13C), electronic storage 14, interface 15 (e.g., bus, wireless interface, etc.), and/or other components. Set of image sensors 12 may generate visual output signals conveying visual information within a capture field. First image sensor 13A may generate images capturing a first portion of the capture field. The capture of images by first image sensor 13A may be characterized by a first rolling shutter direction. Second image sensor 13B may generate images capturing a second portion of the capture field. The capture of images by second image sensor 13B may be characterized by a second rolling shutter direction. The first portion may be adjacent to the second portion. The first rolling shutter direction may be parallel to and the same as the second rolling shutter direction. A first image may be obtained from first image sensor 13A. A second image may be obtained from second image sensor 13B. A stitched image may be generated based on the first image and the second image.

Visual content may refer to media content that may be observed visually. Visual content may be captured at a moment in time, at multiple moments in time, during a period of time, and/or during multiple periods of time. Visual content may include one or more of an image, a sequence of images, a frame of a video, a video, and/or other visual content. Visual content may be captured through the use of one or more cameras/image sensors. The captured images/videos may be stitched together to form the stitched visual content.

In some implementations, stitched visual content may include stitched spherical visual content. Spherical visual content may refer to visual content including multiple views from a location. Spherical visual content may include visual content obtained by a spherical capture. Stitched Spherical visual content may include a full spherical visual capture (360 degrees of capture) or a partial spherical visual capture (less than 360 degrees of capture). In some implementations, stitched visual content may include inverse visual content. Inverse visual content may refer to visual content including multiple views of a location/object. Inverse visual content may allow a user to rotate a viewing field of view around a location/object (e.g., bullet time effect, etc.). In some implementations, stitched visual content may include a three-dimensional reconstruction of a location/object. Other types of visual content generated via stitching are contemplated.

Figure 3A:
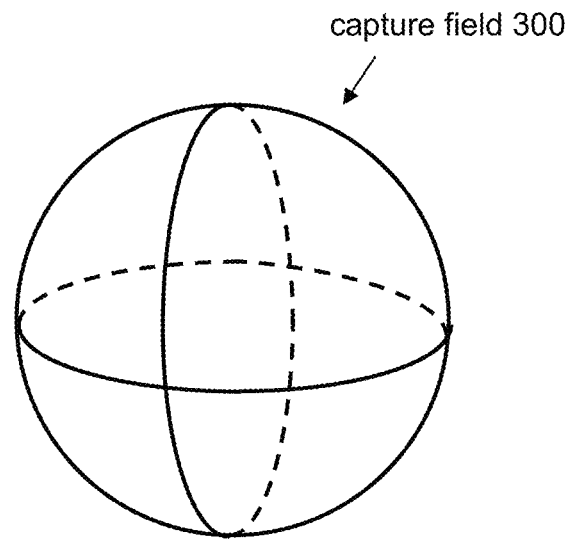
FIGS. 3A-3B illustrate an exemplary capture field.
Figure 3B:
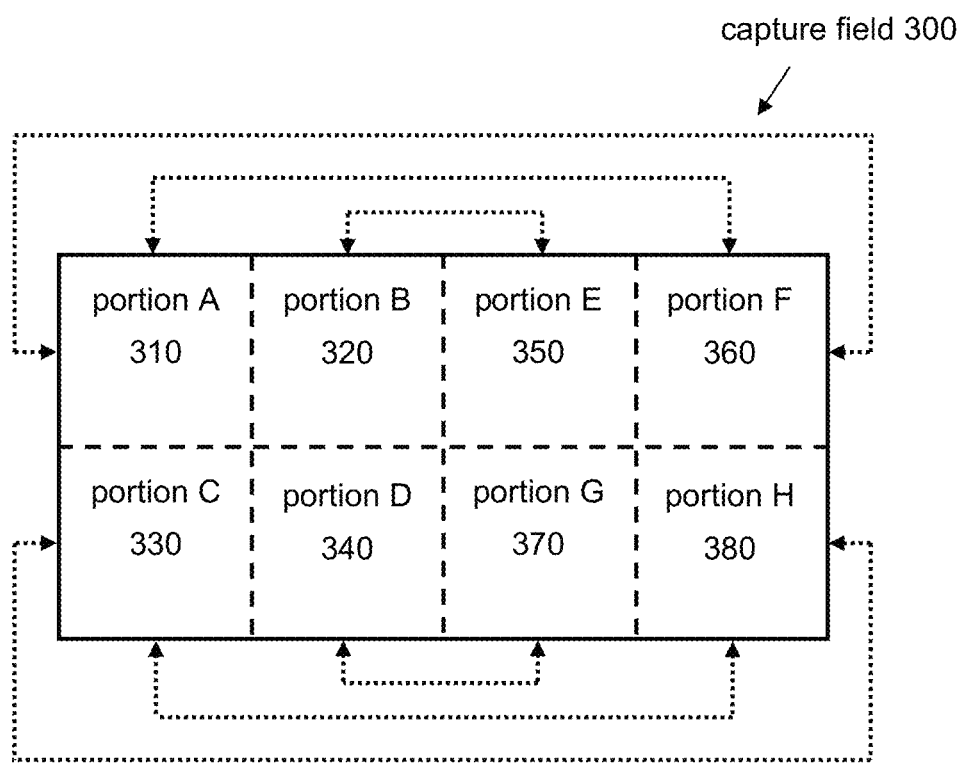

Set of image sensors 12 may be configured to generate visual output signals conveying visual information within a capture field. FIGS. 3A-3B illustrate exemplary capture field 300. Capture field 300 in FIG. 3A may include a spherical field of view around set of image sensors 12. Other types of field of view of set of image sensors 12 are contemplated.

FIG. 3B may illustrates capture field 300 in an equirectangular projection. Capture field 300 may include one or more portions corresponding to fields of view of different image sensors within set of image sensors 12. For example, portions of capture field 300 shown in FIG. 3A may correspond to fields of view of eight image sensors within set of image sensors 12.

Capture field 300 may include portion A, 310, portion B 320, portion C 330, portion D 340, portion E 350, portion F 360, portion G 370, portion H 380, and/or other portions. Portion A 310, portion B 320, portion C 330, and portion D 340 may correspond to a hemisphere (e.g., front hemisphere) of capture field 300 shown in FIG. 3A. Portion E 350, portion F 360, portion G 370, and portion H 380 may correspond to another hemisphere (e.g., back hemisphere) of capture field 300 shown in FIG. 3A.

One or more portions of capture field 300 may be adjacent to one or more other portions of capture field 300. For example, portion A 310 may be adjacent to portion B 320, portion C 330, portion F 360, and/or other portions. Portion B 320 may be adjacent to portion A 310, portion D 340, portion E 350, and/or other portions. Portion C 330 may be adjacent to portion A 310, portion D 340, portion H 380, and/or other portions. Portion D 340 may be adjacent to portion B 320, portion C 330, portion G 370, and/or other portions. Portion E 350 may be adjacent to portion B 320, portion F 360, portion G 370, and/or other portions. Portion F 360 may be adjacent to portion A 310, portion E 350, portion H 380, and/or other portions. Portion G 370 may be adjacent to portion D 340, portion E 350, portion H 380, and/or other portions. Portion H 380 may be adjacent to portion C 330, portion F 360, portion G 370, and/or other portions.

Portion B 320 may adjacent to portion E 350 based on a right part of portion B 320 being adjacent to a left part of the portion E 350. Portion B 320 may be further adjacent to portion E 350 based on a top part of portion B 320 being adjacent to a top part of portion E 350. Portion D 340 may be adjacent to portion B 320 based on a top part of portion D 340 being adjacent to a bottom part of portion B 320.

One or more portions of capture field 300 may be diagonal to one or more other portions of capture field 300. For example, for portion A, 310, portion B 320, portion C 330, and portion D 340, portion A 310 may be diagonal to portion D 340 and portion B 320 may be diagonal to portion C 330. Other arrangements of portions of capture field 300 are contemplated.

Figure 3C:
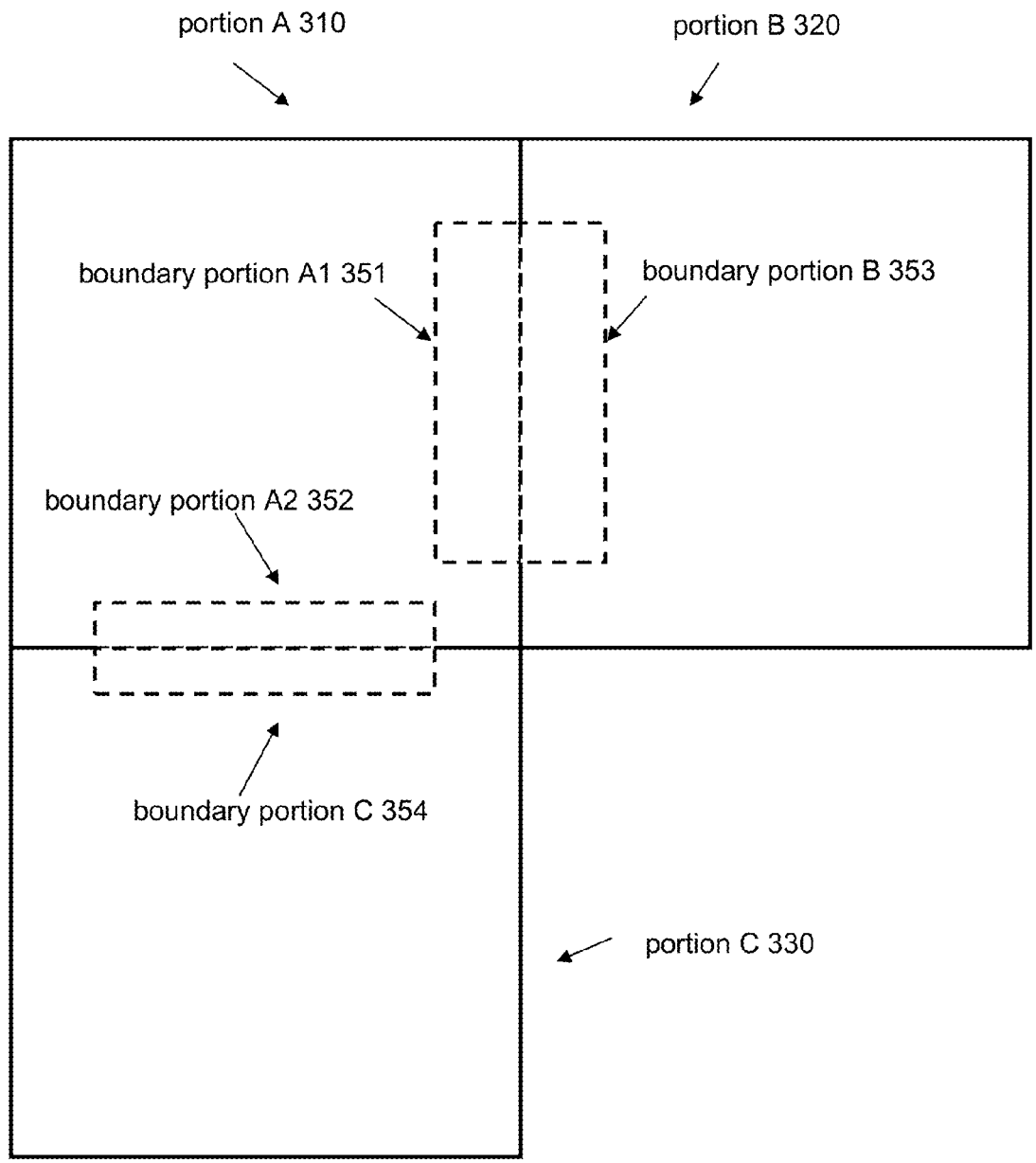
FIGS. 3C-3E illustrates exemplary portions of a capture field.

One or more portions of capture field 300 may include one or more boundary portions. For example, as shown in FIG. 3C, portion A 310 may include boundary portion A1 351, boundary portion A2 352, and/or other boundary portions. Portion B 320 may include boundary portion B 353, and/or other boundary portions. Portion C 330 may include boundary portion C 354, and/or other boundary portions Other boundary portions are contemplated. Boundary portion A1 351 may be adjacent to boundary portion B 353 and/or other boundary portions. Boundary portion A2 352 may be adjacent to boundary portion C 354 and/or other boundary portions.

Figure 3D:
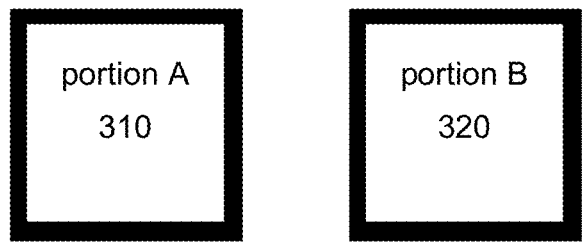
Figure 3E:
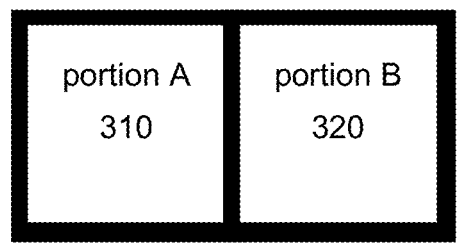

In some implementations, one or more portions of capture field 300 may overlap with one or more other portions of the capture field. Overlapping parts may correspond to overlap between the fields of view of different image sensors within set of image sensors 12. For example, FIGS. 3D and 3E may illustrate overlapping parts of portion A 310 and portion B 320. Portion A 310 may correspond to a field of view of first image sensor 13A. Portion B 320 may correspond to a field of view of second image sensor 13B. The filled-in parts of portion A 310 and portion B 320 may correspond to overlapping parts. For example, as shown in FIG. 3E, right overlapping part of portion A 310 may overlap with left overlapping part of portion B 320. Other overlapping parts are contemplated.

While portions of capture field 300 in FIGS. 3B-3E are shown to be square in shape, this is merely for ease of reference and is not limiting. Portions of capture field 300 and/or fields of view of different image sensors within set of image sensors 12 may include other shapes and/or sizes.

Set of image sensors 12 may include two or more image sensors, and/or other components. For example, set of image sensors 12 may include first image sensor 13A, second image sensor 13B, and/or other image sensors 13D. In some implementations, set of image sensors 12 may include third image sensor 13C. In some implementations, set of image sensors 12 may include eight image sensors. In some implementations, set of image sensors 12 may include ten image sensors. Other numbers of image sensors within set of image sensors 12 are contemplated.

Set of image sensors 12 may include one or more of a charge-coupled device sensor, an active pixel sensor, a complementary metal-oxide semiconductor sensor, an N-type metal-oxide-semiconductor sensor, and/or other image sensors. One or more optical elements may be configured to guide light to set of image sensors 12. Optical components may refer to components that directly and/or indirectly guide light onto set of image sensors 12. Optical components may include one or more of a lens, a mirror, a prism, and/or other optical components.

Figure 4A:
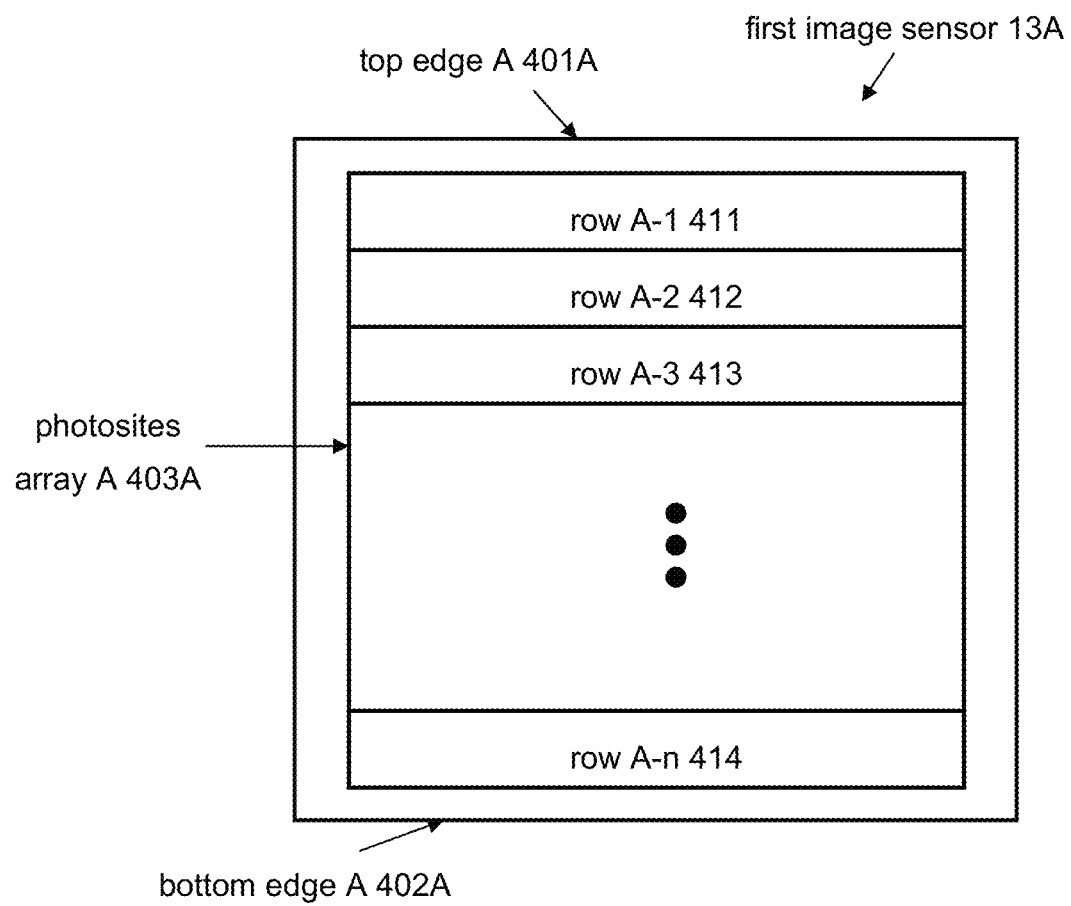
FIG. 4A illustrates an example of a first image sensor.

First image sensor 13A may be configured to generate first visual output signals conveying visual information within a portion of the capture field. For example, first image sensor 13A may generate first visual output signals conveying visual information within portion A 310 of capture field 300. As shown in FIG. 4A, first image sensor 13A may include an array of photosites (e.g., photosites array A 403A) and/or other photosites. First image sensor 13A may have top edge A 401A and bottom edge A 402A that is opposite of top edge A 401A. Photosites array A 403A may have a set of rows of photosites arrayed between top edge A 401A and bottom edge A 402A. The set of rows may include row A-1 411, row A-2 412, row A-3 413, row A-n 414, and/or other rows. Row A-1 411 may be adjacent to row A-2 412. Row A-3 413 may be adjacent to row A-2 412. In some implementations, the set of rows of photosites may be arrayed between other opposing edges (e.g., left edge and right edge, etc.) of first image sensor 13A.

The first visual output signals conveying the visual information within portion A 310 of capture field 300 may be generated based on light incident on photosites array A 403A of first image sensor 13A and/or other information. First image sensor 13A may generate the first visual output signals sequentially across the set of rows of photosites (e.g., row A-1 411, row A-2 412, row A-3 413, row A-n 414, etc.) such that the first visual output signals are generated row by row from top edge A 401A to bottom edge A 402A.

Figure 4B:
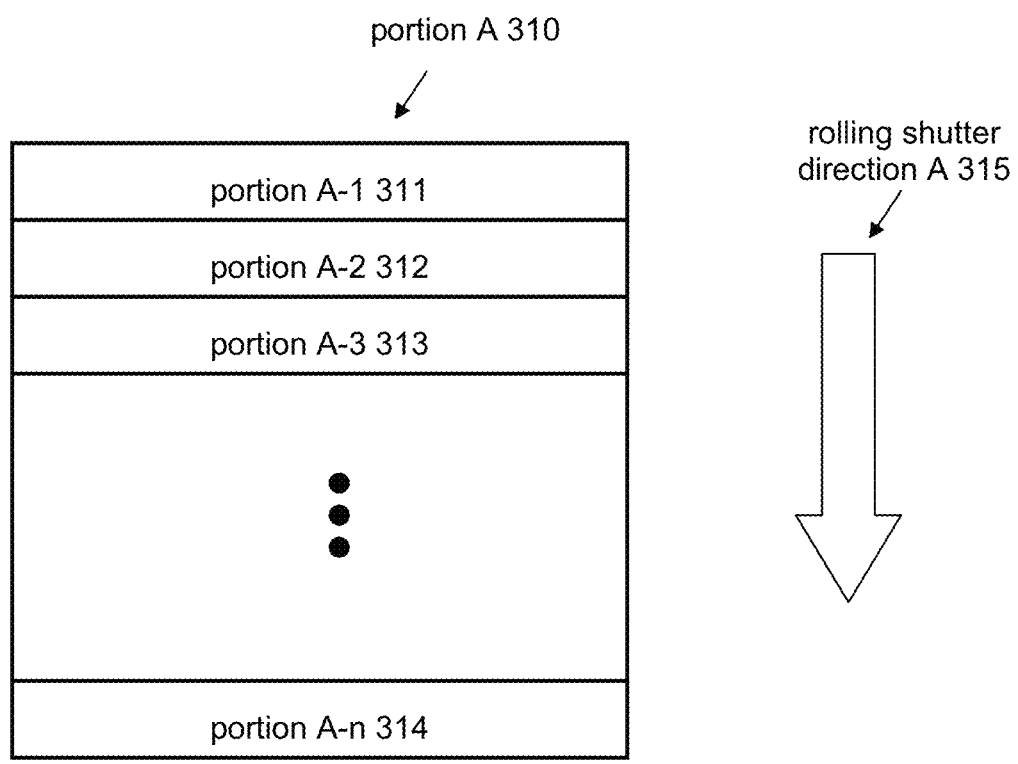
FIG. 4B illustrates an example of a first rolling shutter direction.

The sequential generation of the first visual output signals may cause the visual information to be defined by the light incident on photosites array A 403A at different times. For example, FIG. 4B illustrates visual information within different parts of portion A 310 being defined by light incident on photosites array A 403A at different times.

For example, first image sensor 13A may generate the first visual output signals based on light incident on row A-1 411 at time t-1 and/or other information. The first visual output signals generated based on light incident on row A-1 411 at time t-1 may include visual information within portion A-1 311 of portion A 310. First image sensor 13A may generate the first visual output signals based on light incident on row A-2 412 at time t-2 (subsequent to time t-1) and/or other information. The first visual output signals generated based on light incident on row A-2 412 at time t-2 may include visual information within portion A-2 312 of portion A 310. First image sensor 13A may generate the first visual output signals based on light incident on row A-3 413 at time t-3 (subsequent to time t-2) and/or other information. The first visual output signals generated based on light incident on row A-3 413 at time t-3 may include visual information within portion A-3 313 of portion A 310. First image sensor 13A may generate the first visual output signals based on light incident on row A-n 414 at time t-n (subsequent to time t-3) and/or other information. The first visual output signals generated based on light incident on row A-n 414 at time t-n may include visual information within portion A-n 314 of portion A 310.

The sequential generation of the first visual output signals may define a rolling shutter direction for portion A 310 of capture field 300. For example, FIG. 4B shows rolling shutter direction A 315 defined by the sequential generation of the first visual output signals described above. Rolling shutter direction A 315 may indicate the direction in which the visual information is defined across portion A 310 as a function of time (e.g., portion A-1 311 defined by visual information at time t-1; portion A-2 312 defined by visual information at time t-2; portion A-3 313 defined by visual information at time t-3; portion A-n 314 by visual information defined at time t-4).

Figure 4C:
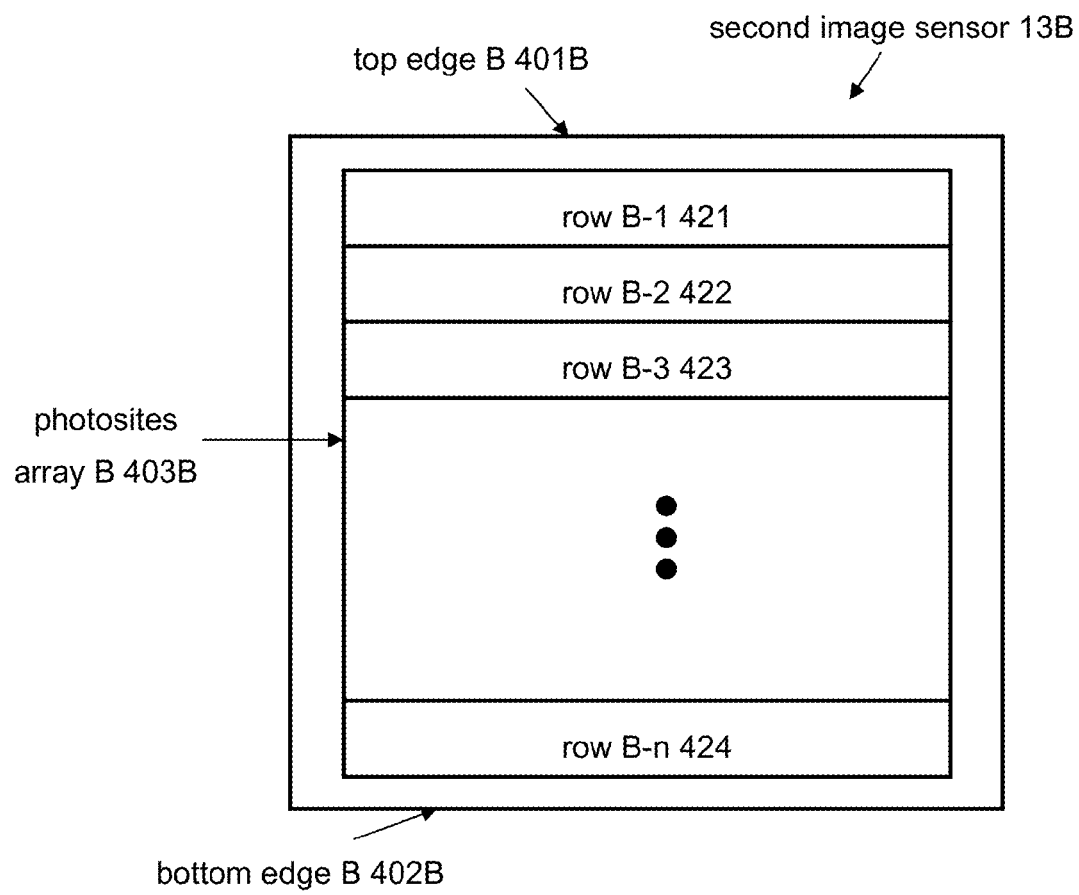
FIG. 4C illustrates an example of a second image sensor.

Second image sensor 13B may be configured to generate second visual output signals conveying visual information within another portion of the capture field. For example, second image sensor 13B may generate second visual output signals conveying visual information within portion B 320 of capture field 300. As shown in FIG. 4C, second image sensor 13B may include an array of photosites (e.g., photosites array B 403B) and/or other photosites. Second image sensor 13B may have top edge B 401B and bottom edge B 402B that is opposite of top edge B 401B. Photosites array B 403B may have a set of rows of photosites arrayed between top edge B 401B and bottom edge B 402B. The set of rows may include row B-1 421, row B-2 422, row B-3 423, row B-n 424, and/or other rows. Row B-1 421 may be adjacent to row B-2 422. Row B-3 423 may be adjacent to row B-2 422. In some implementations, the set of rows of photosites may be arrayed between other opposing edges (e.g., left edge and right edge, etc.) of second image sensor 13B.

The second visual output signals conveying the visual information within portion B 320 of capture field 300 may be generated based on light incident on photosites array B 403B of second image sensor 13B and/or other information. Second image sensor 13B may generate the second visual output signals sequentially across the set of rows of photosites (e.g., row B-1 421, row B-2 422, row B-3 423, row B-n 424, etc.) such that the second visual output signals are generated row by row from top edge B 401B to bottom edge B 402B.

Figure 4D:
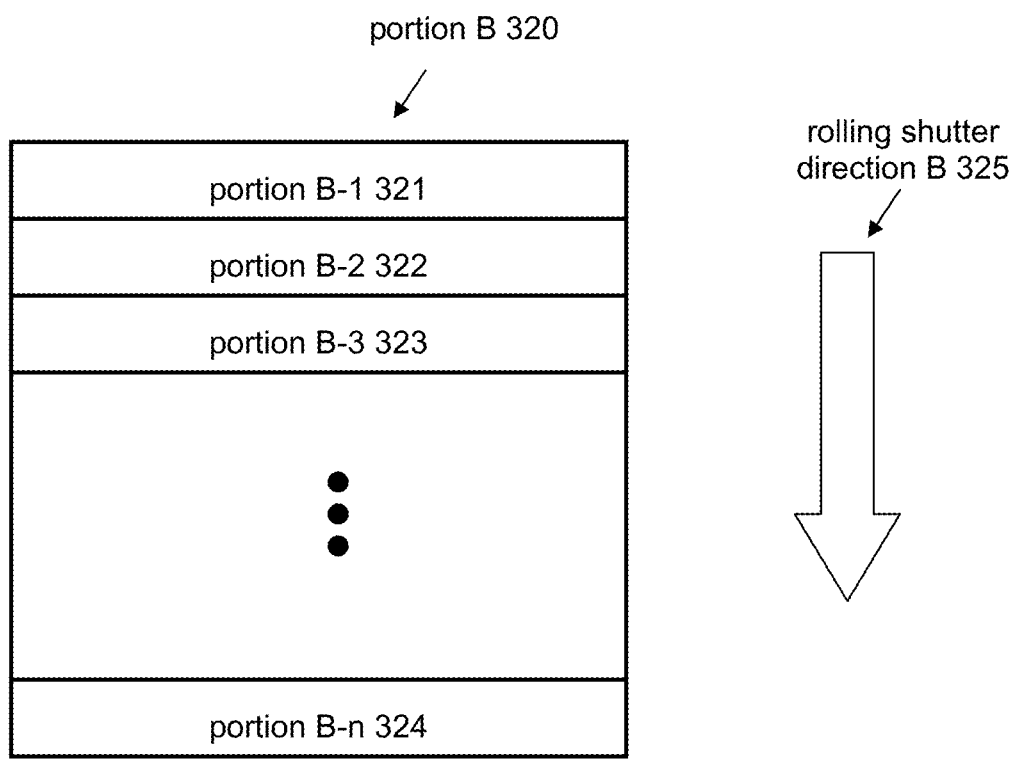
FIG. 4D illustrates an example of a second rolling shutter direction.

The sequential generation of the second visual output signals may cause the visual information to be defined by the light incident on photosites array B 403B at different times. For example, FIG. 4D illustrates visual information within different parts of portion B 320 being defined by light incident on photosites array B 403B at different times.

For example, second image sensor 13B may generate the second visual output signals based on light incident on row B-1 421 at time t-1 and/or other information. The second visual output signals generated based on light incident on row B-1 421 at time t-1 may include visual information within portion B-1 321 of portion B 320. Second image sensor 13B may generate the second visual output signals based on light incident on row B-2 422 at time t-2 (subsequent to time t-1) and/or other information. The second visual output signals generated based on light incident on row B-2 422 at time t-2 may include visual information within portion B-2 322 of portion B 320. Second image sensor 13B may generate the second visual output signals based on light incident on row B-3 423 at time t-3 (subsequent to time t-2) and/or other information. The second visual output signals generated based on light incident on row B-3 423 at time t-3 may include visual information within portion B-3 323 of portion B 320. Second image sensor 13B may generate the second visual output signals based on light incident on row B-n 424 at time t-n (subsequent to time t-3) and/or other information. The second visual output signals generated based on light incident on row B-n 424 at time t-n may include visual information within portion B-n 324 of portion B 320.

The sequential generation of the second visual output signals may define a rolling shutter direction for portion B 320 of capture field 300. For example, FIG. 4D shows rolling shutter direction B 325 defined by the sequential generation of the second visual output signals described above. Rolling shutter direction B 325 may indicate the direction in which the visual information is defined across portion B 320 as the function of time (e.g., portion B-1 321 defined by visual information at time t-1; portion B-2 322 defined by visual information at time t-2; portion B-3 323 defined by visual information at time t-3; portion B-n 324 defined by visual information at time t-4).

Figure 5A:
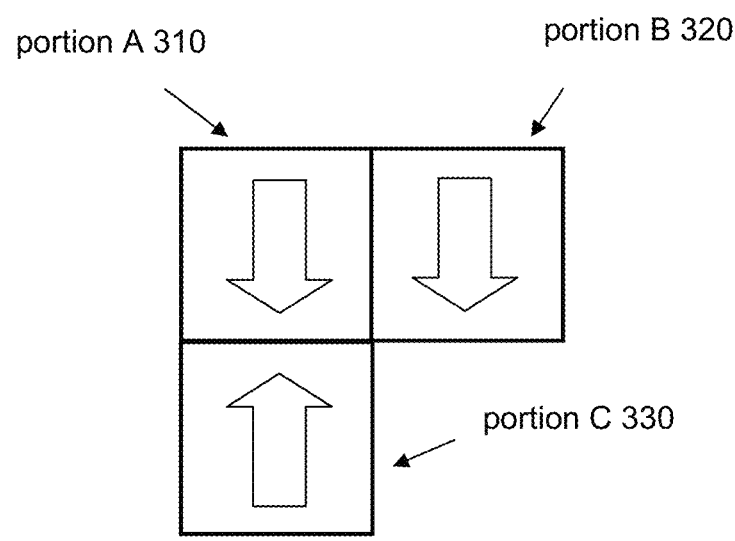
FIGS. 5A-5B illustrate examples of rolling shutter directions for portions of a capture field.
Figure 5B:
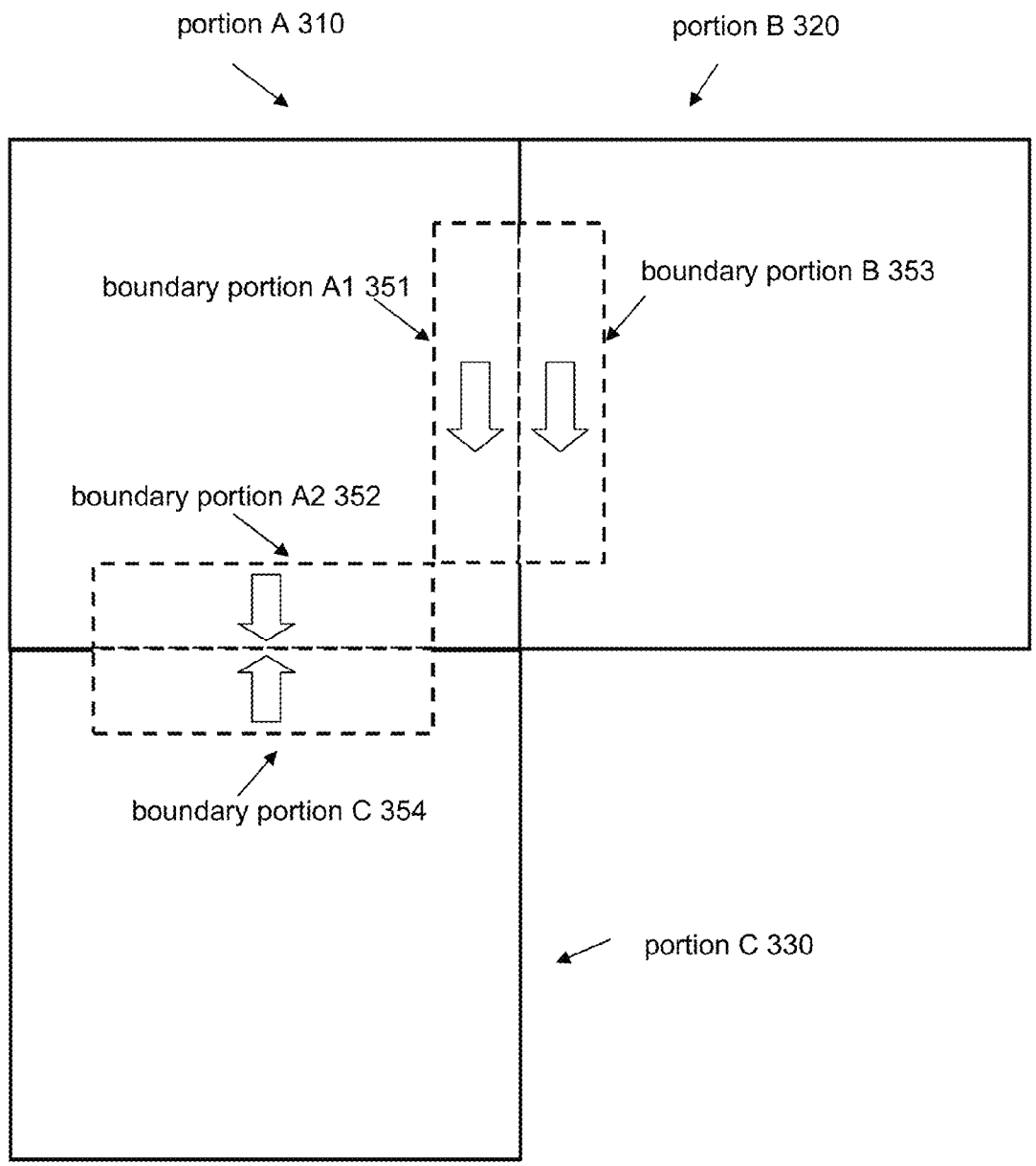

Rolling shutter direction B 325 may be parallel to and the same as rolling shutter direction A 315. For example, FIG. 5A shows exemplary rolling shutter directions for rolling shutter direction A 315 (arrow inside portion A 310) and rolling shutter direction B 325 (arrow inside portion B 320). In some implementations, rolling shutter direction B 325 may be parallel to and the same as rolling shutter direction A 315 along a boundary between the right part of portion A 310 and the left part of portion B 320. For example, as shown in FIG. 5B, a boundary between the right part of portion A 310 and the left part of portion B 320 may include boundary portion A1 351, boundary portion B 353, and/or other boundary portions. Rolling shutter direction B 325 within boundary portion B 353 may be parallel to and the same as rolling shutter direction A 315 within boundary portion A1 351.

In some implementations, the sequential generation of the first visual output signals and the sequential generation of the second visual output signals may be synchronized in time. The sequential generations of the first visual output signals and the second visual output signals may be synchronized such that the visual information within boundary portion A1 351 and the visual information within boundary portion B 353 are defined at one or more same moments in time. For example, referring to FIG. 5B, the visual information within a top third of boundary potion A1 351 and the visual information within a top third of boundary portion B 353 may be defined at time t-A. Visual information within a middle third of boundary potion A1 351 and the visual information within a middle third of boundary portion B 353 may be defined at time t-B (subsequent to time t-A). Visual information within a bottom third of boundary potion A1 351 and the visual information within a bottom third of boundary portion B 353 may be defined at time t-C (subsequent to time t-B). Other synchronized generation of the first visual output signals and the second visual output signals are contemplated. Synchronized generation of the first visual output signals and the second visual output signals may reduce temporal discontinuities between images generated by first image sensor 13A and second image sensor 13B.

Figure 4E:
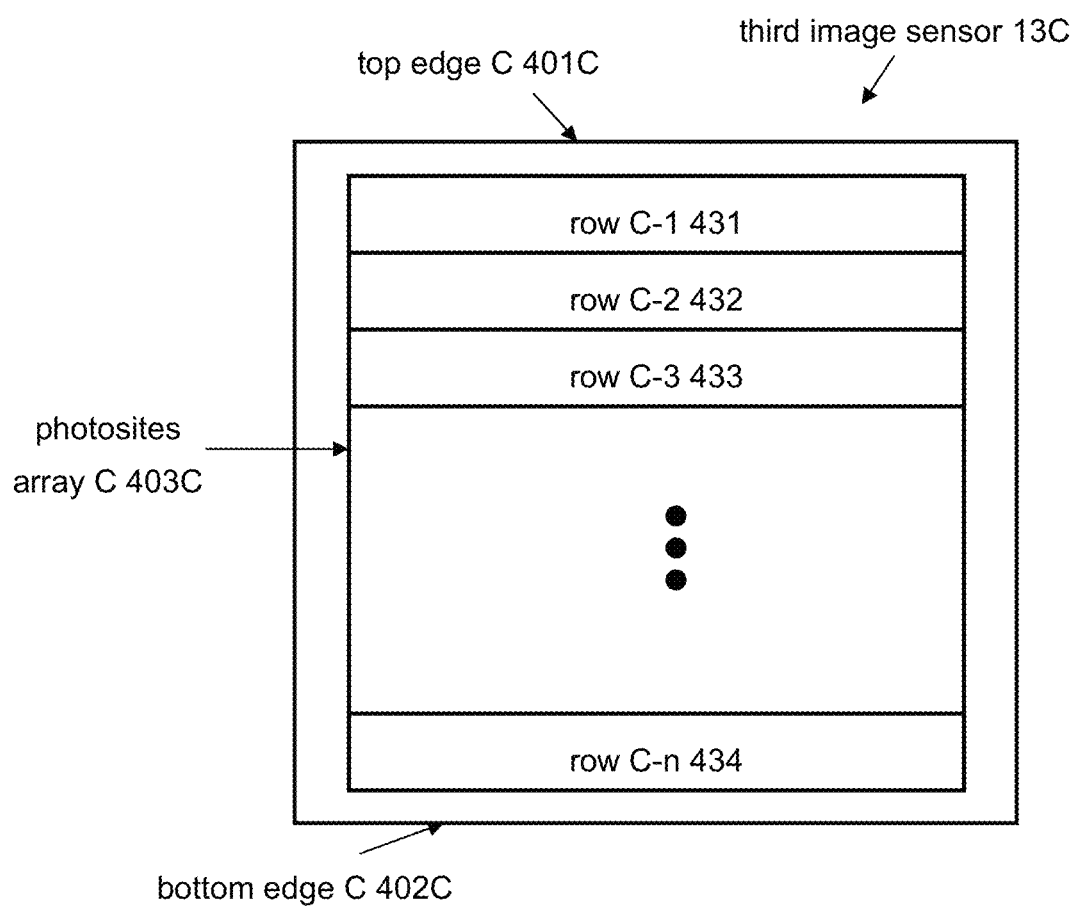
FIG. 4E illustrates an example of a third image sensor.

Third image sensor 13C may be configured to generate third visual output signals conveying visual information within another portion of the capture field. For example, third image sensor 13C may generate third visual output signals conveying visual information within portion C 330 of capture field 300. As shown in FIG. 4E, third image sensor 13C may include an array of photosites (e.g., photosites array C 403C) and/or other photosites. Third image sensor 13C may have top edge C 401C and bottom edge C 402C that is opposite of top edge C 401C. Photosites array C 403C may have a set of rows of photosites arrayed between top edge C 401C and bottom edge C 402C. The set of rows may include row C-1 431, row C-2 432, row C-3 433, row C-n 434, and/or other rows. Row C-1 431 may be adjacent to row C-2 432. Row C-3 433 may be adjacent to row C-3 432. In some implementations, the set of rows of photosites may be arrayed between other opposing edges (e.g., left edge and right edge, etc.) of third image sensor 13C.

The third visual output signals conveying the visual information within portion C 320 of capture field 300 may be generated based on light incident on photosites array C 403C of third image sensor 13C and/or other information. Third image sensor 13C may generate the third visual output signals sequentially across the set of rows of photosites (e.g., row C-1 431, row C-2 432, row C-3 433, row C-n 434, etc.) such that the third visual output signals are generated row by row from top edge C 401C to bottom edge C 402C.

Figure 4F:
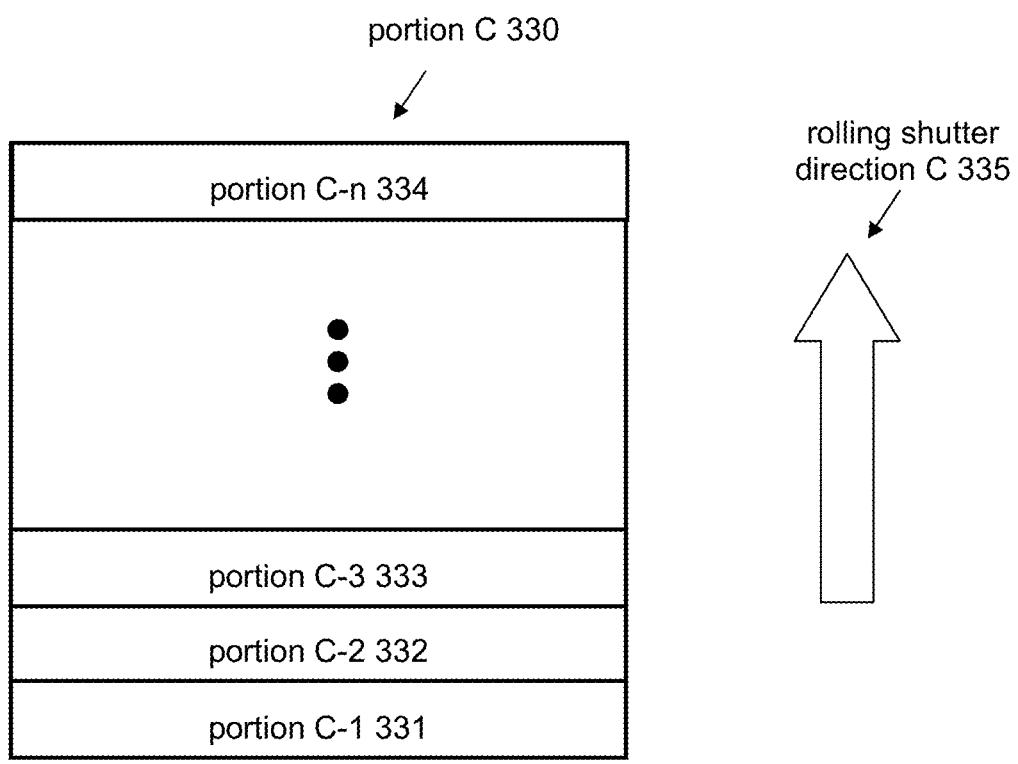
FIG. 4F illustrates an example of a third rolling shutter direction.

The sequential generation of the third visual output signals may cause the visual information to be defined by the light incident on photosites array C 403C at different times. For example, FIG. 4F illustrates visual information within different parts of portion C 330 being defined by light incident on photosites array C 403C at different times.

For example, third image sensor 13C may generate the third visual output signals based on light incident on row C-1

431 at time t-1 and/or other information. The third visual output signals generated based on light incident on row C-1 431 at time t-1 may include visual information within portion C-1 331 of portion C 330. Third image sensor 13C may generate the third visual output signals based on light incident on row C-2 432 at time t-2 (subsequent to time t-1) and/or other information. The third visual output signals generated based on light incident on row C-2 432 at time t-2 may include visual information within portion C-2 332 of portion C 330. Third image sensor 13C may generate the third visual output signals based on light incident on row C-3 433 at time t-3 (subsequent to time t-2) and/or other information. The third visual output signals generated based on light incident on row C-3 433 at time t-3 may include visual information within portion C-3 333 of portion C 330. Third image sensor 13C may generate the third visual output signals based on light incident on row C-n 434 at time t-n (subsequent to time t-3) and/or other information. The third visual output signals generated based on light incident on row C-n 434 at time t-n may include visual information within portion C-n 334 of portion C 330.

The sequential generation of the third visual output signals may define a rolling shutter direction for portion C 330 of capture field 300. For example, FIG. 4F shows rolling shutter direction C 335 defined by the sequential generation of the third visual output signals described above. Rolling shutter direction C 335 may indicate the direction in which the visual information is defined across portion C 330 as the function of time (e.g., portion C-1 331 defined by visual information at time t-1; portion C-2 332 defined by visual information at time t-2; portion C-3 333 defined by visual information at time t-3; portion C-n 334 defined by visual information at time t-4).

Rolling shutter direction C 335 may be opposite of rolling shutter direction A 315. For example, FIG. 5A shows exemplary rolling shutter directions for rolling shutter direction A 315 (arrow inside portion A 310) and rolling shutter direction C 335 (arrow inside portion C 330). In some implementations, rolling shutter direction C 335 may be opposite of rolling shutter direction A 315 along a boundary between the bottom part of portion A 310 and the top part of portion C 330. For example, as shown in FIG. 5B, a boundary between the bottom part of portion A 310 and the top part of portion C 330 may include boundary portion A2 352, boundary portion C 354, and/or other boundary portions. Rolling shutter direction C 335 within boundary portion C 354 may be opposite of rolling shutter direction A 315 within boundary portion A2 352.

In some implementations, the sequential generation of the first visual output signals and the sequential generation of the third visual output signals may be synchronized in time. The sequential generations of the first visual output signals and the third visual output signals may be synchronized such that the visual information within boundary portion A2 352 and the visual information within boundary portion C are defined at one or more same moments in time. For example, referring to FIG. 5B, the visual information within a top third of boundary potion A2 352 and the visual information within a bottom third of boundary portion C 354 may be defined at time t-X. Visual information within a middle third of boundary potion A2 352 and the visual information within a middle third of boundary portion C 354 may be defined at time t-Y (subsequent to time t-X). Visual information within a bottom third of boundary potion A2 and the visual information within a top third of boundary portion C 354 may be defined at time t-Z (subsequent to time t-Y). Other synchronized generation of the first visual output signals and the third visual output signals are contemplated. Synchronized generation of the first visual output signals and the third visual output signals may reduce temporal discontinuities between images generated by first image sensor 13A and third image sensor 13C.

Figure 6:
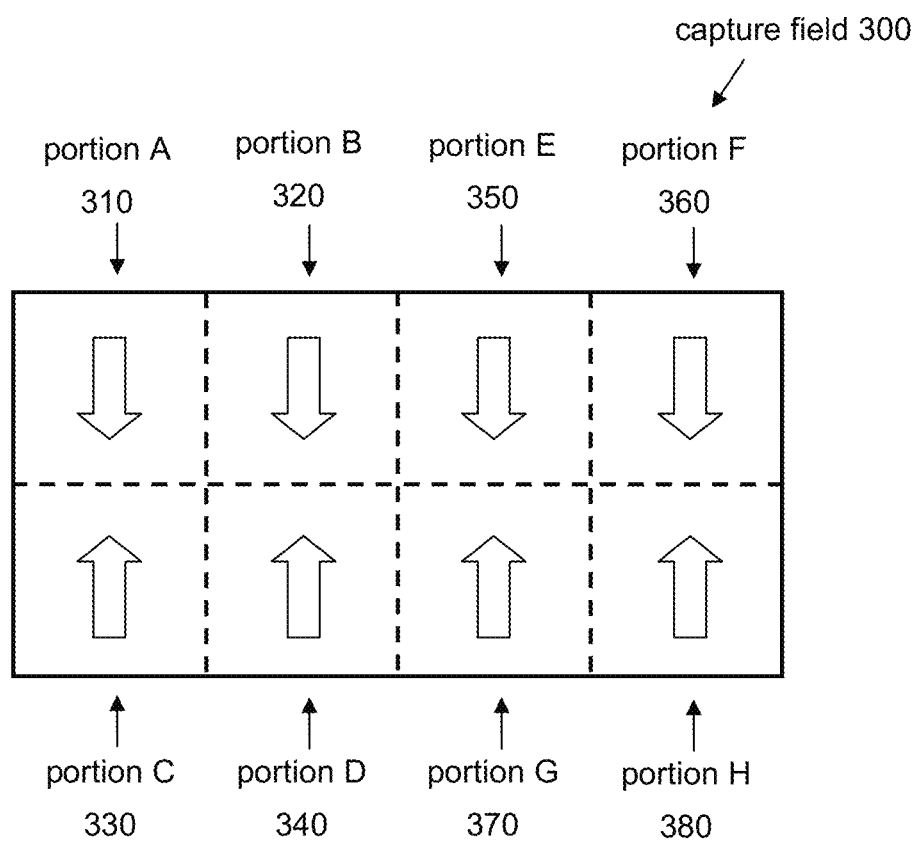
FIG. 6 illustrate an example of rolling shutter directions for eight portions of a capture field.

FIG. 6 illustrates an example of rolling shutter directions for different portions of capture field 300. In some implementations, rolling shutter directions within adjacent portions of capture field 300 may be parallel to and the same as each other along one adjacent portion and be opposite of each other along another adjacent portion. For example, referring to FIG. 6, portion B 320 may be adjacent to portion E 350 along two edges—right part of portion B 320 may be adjacent to left part of portion E 350; top part of portion B 320 may be adjacent to top part of portion E 350. Along the right edge of portion B 320, rolling shutter directions of portion B 320 and portion E 350 may be parallel to and the same as each other. Along the top edge of portion B 320, rolling shutter directions of portion B 320 and portion E 350 may be opposite of each other.

Figure 7:
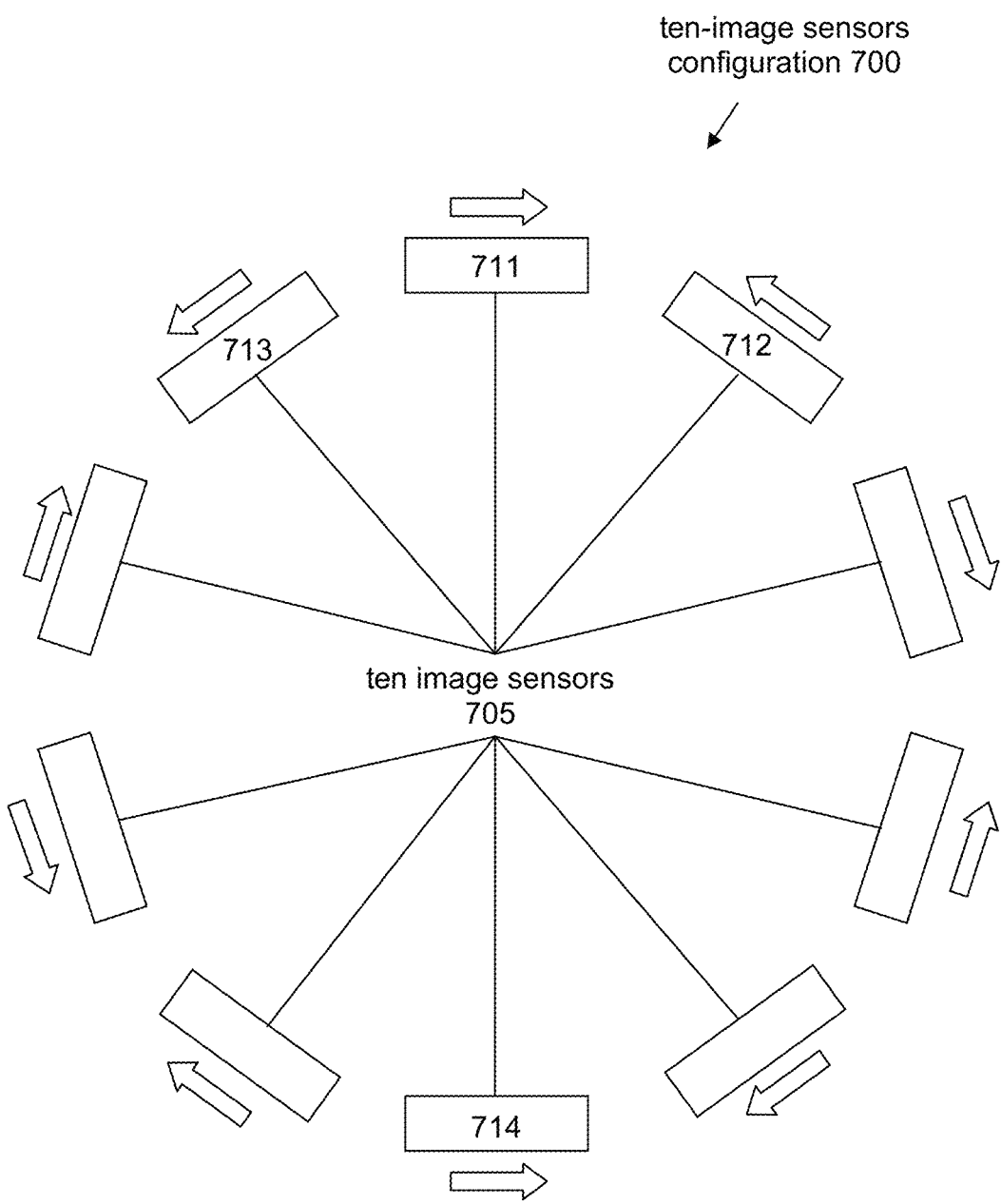
FIG. 7 illustrates an example of a ten-image sensors configuration.

FIG. 7 illustrates an example of rolling shutter directions for ten-image sensor configuration 700 according one implementation of the disclosure. As shown in FIG. 7, ten-image sensor configuration 700 may include ten image sensors 705 organized in a circular arrangement. Fields of view for ten image sensors 705 may define a capture field. A field of view of top image sensor 711 may be adjacent to fields of view of top-right image sensor 712, top-left image sensor 713, bottom image sensor 714, and/or other image sensors. The rolling shutter direction for top image sensor 711 may be parallel and the same as the rolling shutter direction for bottom image sensor 714. The rolling shutter direction for top image sensor 711 may be opposite of the rolling shutter directions for top-right image sensor 712 and top-left image sensor 713. Other configurations of image sensors and rolling shutter directions are contemplated.

Electronic storage 14 may include electronic storage medium that electronically stores information. Electronic storage 14 may store software algorithms, information determined by processor 11, information received remotely, and/or other information that enables system 10 to function properly. For example, electronic storage 14 may store information relating to set of image sensors 12, visual information, capture field, portions of capture field, rolling shutter directions, obtaining visual content, stitching visual content, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate capturing stitched visual content. Machine-readable instructions 100 may include one or more computer program components. Machine readable instructions 100 may include one or more of imaging component 102, stitching component 104, and/or other computer program components.

Imaging component 102 may be configured to obtain one or more images based on one or more visual information and/or other information. For example, imaging component 102 may obtain a first image based on the visual information within portion A 310 of capture field 300 and/or other information. Imaging component 102 may obtain a second image based on the visual information within portion B 320 of capture field 300 and/or other information. Imaging component 102 may obtain a third image based on the visual information within portion B 330 of capture field 300 and/or other information. Imaging component 102 may obtain other images based on the same and/or other visual information within capture field 300.

Stitching component 104 may be configured to generate one or more stitched images. The stitched image(s) may be generated based on one or more images obtained by imaging component 102 and/or other information. Stitching component 104 may generate a stitched image based on the first image, the second image, and/or other information. In some implementations, stitching component 104 may generate the stitched image further based on the third image, and/or other images/information. In some implementations, stitching component 104 may stitch images together to form a spherical image. In some implementations, stitching component 104 may stitch images together to form a reverse image of a location/object (e.g., allowing bullet time effect, etc.). In some implementations, stitching component 104 may stitch images together to form a three-dimensional reconstruction of a location/object.

Figure 8A:
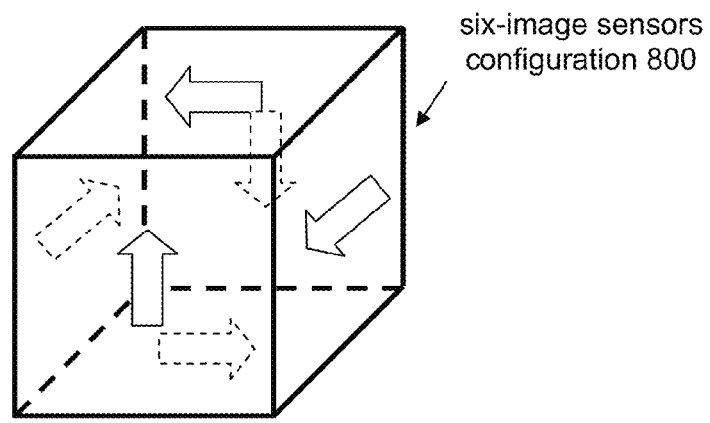
FIG. 8A illustrates an example of a six-image sensors configuration.
Figure 8B:
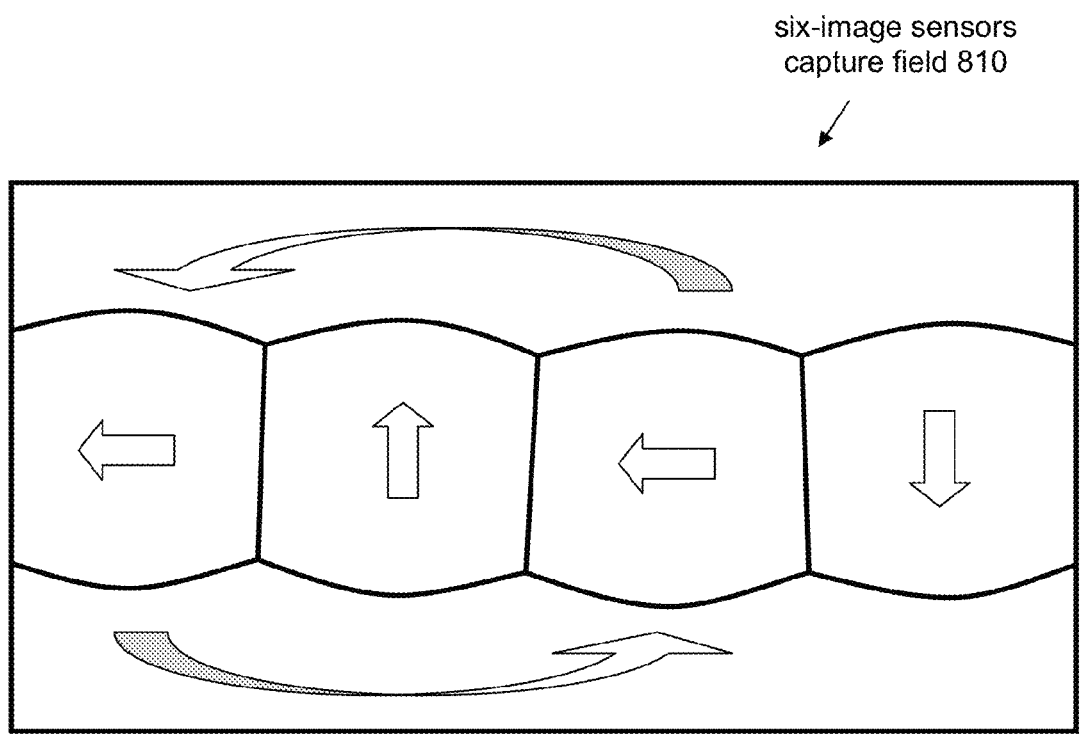
FIG. 8B illustrates an example of a capture field for the six-image sensors configuration of FIG. 8A.

FIG. 8A illustrates an example of six-image sensor configuration 800 not in accordance with the present disclosure. As shown in FIGS. 8A-8B, six-image sensor configuration 800 may include rolling shutter directions that are not aligned in accordance with the present disclosure. Image sensors within six-image sensor configuration 800 may generate visual output signals conveying visual information within six-image sensors capture field 810, as shown in FIG. 8B. The rolling shutter directions within portions of six-image sensors capture field 810 may be orthogonal to each other.

Figure 8C:
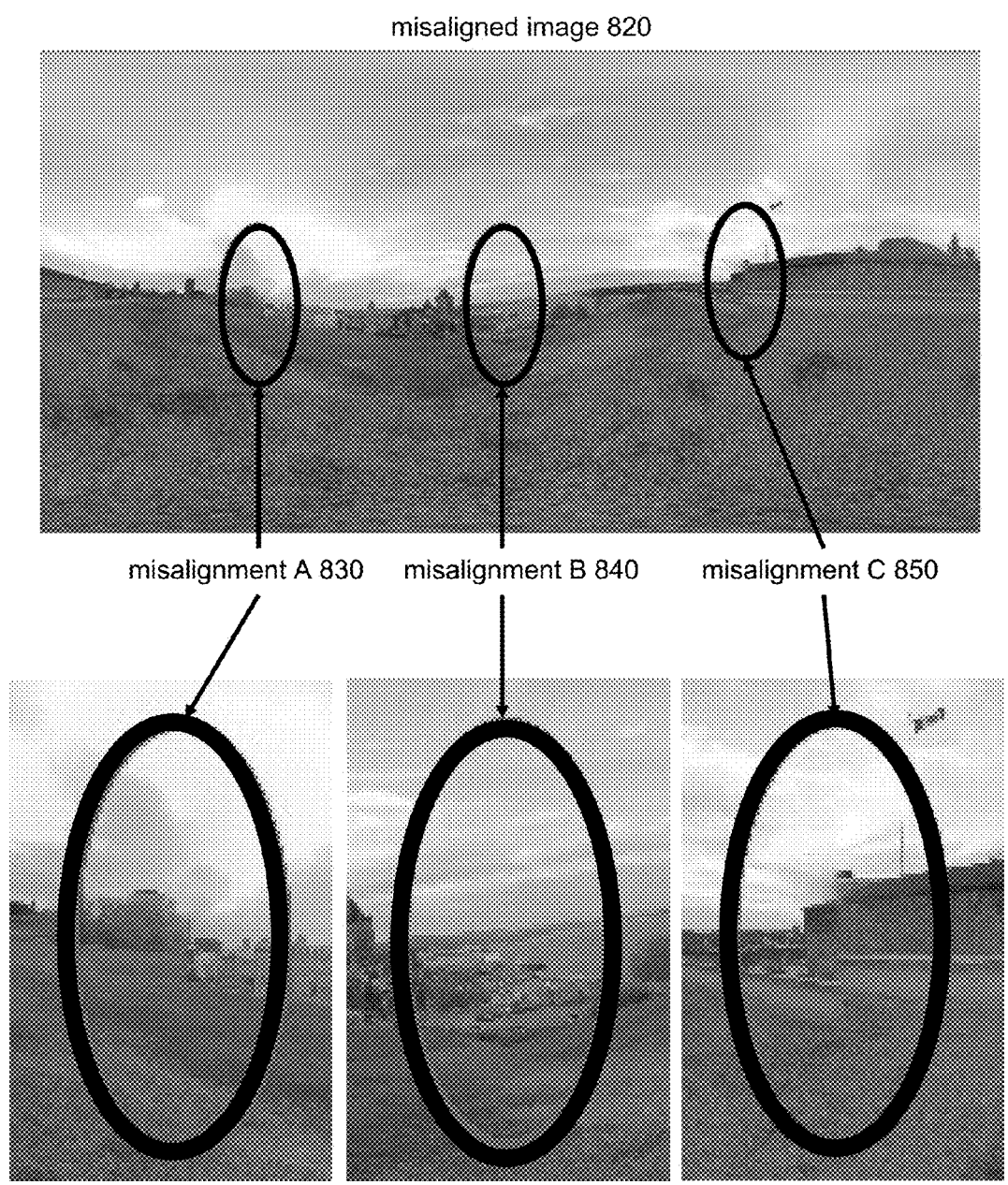
FIG. 8C illustrates an example of a stitched spherical image generated based on the rolling shutter directions shown in FIG. 8B.

FIG. 8C illustrates an example of a stitched spherical image (misaligned image 820) generated based on the rolling shutter directions shown in FIG. 8B. The orthogonal shutter directions of six-image sensor configuration 800 may result in one or more misalignments of visuals within misaligned image 820. For example, misaligned image 820 may include misalignment A 830, misalignment B 840, misalignment C 850, and/or other misalignments. Misalignment A 830 may include a left part of an image portion being shifted up compared to a right part of the image portion. Misalignment B 840 may include a left part of an image portion being slanted with respect to a right part of the image portion. Misalignment C 850 may include a left part of an image portion being shifted down compared to a right part of the image portion. Misaligned image may 820 include other misalignments of visuals.

Figure 9:
FIG. 9 illustrates an example of a stitched spherical image generated based on the rolling shutter directions shown in FIG. 6.

FIG. 9 illustrates an example of a stitched spherical image (aligned image 900) generated based on the rolling shutter directions shown in FIG. 6. Aligned image 900 may include less/no misalignment of visuals at image portions corresponding to image portions of misalignment A 830, misalignment B 840, and misalignment C 850 of misaligned image 820.

In some implementations, one or more stitched videos may be generated based on stitched images. For example, one or more frames of a stitched video may include one or more stitched images. One or more stitched videos may be generated during the acquisition of videos by multiple image sensors and/or after the acquisition of the videos by multiple image sensors.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11, set of image sensors 12 (including first image sensor 13A, second image sensor 13B, third image sensor 13C), and electronic storage 14 are shown to be connected to an interface 15 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 14. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, and/or 104 may be eliminated, and some or all of its functionality may be provided by other computer program components. As another example, processor 11 may be configured to execute one or more additional computer program components that may perform some or all of the functionality attributed to one or more of computer program components 102 and/or 104 described herein.

Although set of image sensors 12 is depicted in FIG. 1 as a single element, this is not intended to be limiting. Set of image sensor 12 may include two or more image sensors in one or more locations. Although image sensors 13A, 13B, 13C, 13D are depicted in FIG. 1 as single elements, this is not intended to be limiting. Image sensors 13A, 13B, 13C, 13D may include one or more image sensors in one or more locations.

The electronic storage media of electronic storage 14 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 14 may be a separate component within system 10, or electronic storage 14 may be provided integrally with one or more other components of system 10 (e.g., processor 11). Although electronic storage 14 is shown in FIG. 1 as a single entity, this is for illustrative purposes only. In some implementations, electronic storage 14 may comprise a plurality of storage units. These storage units may be physically located within the same device, or electronic storage 14 may represent storage functionality of a plurality of devices operating in coordination.

Figure 2:
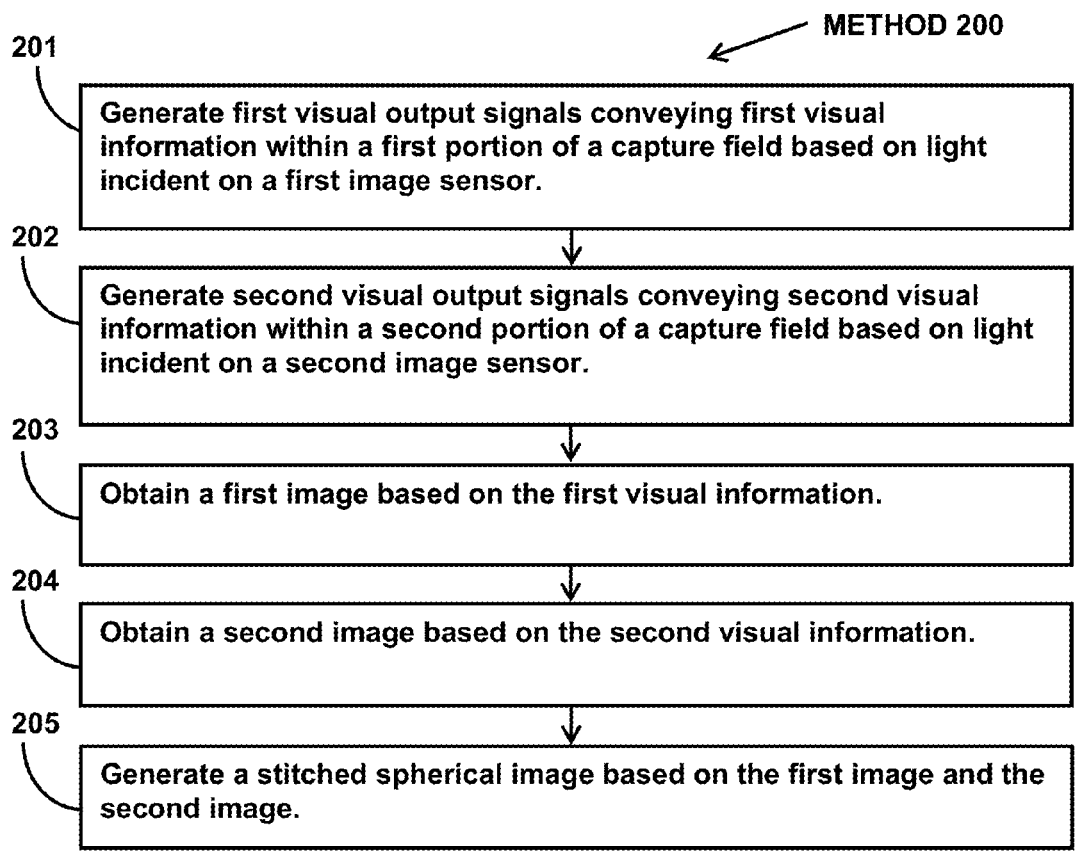
FIG. 2 illustrates a method for capturing stitched visual content.

FIG. 2 illustrates method 200 for capturing stitched visual content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, first visual output signals may be generated. The first visual output signals may convey first visual information within a first portion of a capture field. The first visual output signals may be generated based on light incident on a first image sensor. In some implementations, operation 201 may be performed by one or more sensors the same as or similar to first image sensor 13A (shown in FIG. 1 and described herein).

At operation 202, second visual output signals may be generated. The second visual output signals may convey second visual information within a second portion of the capture field. The second visual output signals may be generated based on light incident on a second image sensor. In some implementations, operation 202 may be performed by one or more sensors the same as or similar to second image sensor 13B (shown in FIG. 1 and described herein).

At operation 203, a first image may be obtained. The first image may be obtained based on the first visual information. In some implementations, operation 203 may be performed by one or more processor components the same as or similar to imaging component 102 (shown in FIG. 1 and described herein).

At operation 204, a second image may be obtained. The second image may be obtained based on the second visual information. In some implementations, operation 204 may be performed by one or more processor components the same as or similar to imaging component 102 (shown in FIG. 1 and described herein).

At operation 205, a stitched image may be generated. The stitched image may be generated based on the first image and the second image. In some implementations, operation 205 may be performed by one or more processor components the same as or similar to stitching component 104 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for capturing stitched visual content, the system comprising:
a set of image sensors configured to generate visual output signals conveying visual information within a capture field, the set of image sensors comprising:
a first image sensor including a first array of photosites, the first image sensor having a first edge and a second edge that is opposite of the first edge, the first array of photosites having a first set of rows arrayed between the first edge and the second edge, the first set of rows including a first row adjacent to a second row and a third row adjacent to the second row, the first image sensor configured to generate first visual output signals conveying first visual information within a first portion of the capture field based on light incident on the first array of photosites, the first image sensor generating the first visual output signals sequentially across the first set of rows such that the first visual output signals are generated row by row from the first edge to the second edge, wherein the sequential generation of the first visual output signals:
causes the first visual information to be defined by the light incident on the first array of photosites at different times; and
defines a first rolling shutter direction for the first portion of the capture field, the first rolling shutter direction indicating a first direction in which the first visual information is defined across the first portion as a function of time; and
a second image sensor including a second array of photosites, the second image sensor having a third edge and a fourth edge that is opposite of the third edge, the second array of photosites having a second set of rows arrayed between the third edge and the fourth edge, the second set of rows including a fourth row adjacent to a fifth row and a sixth row adjacent to the fifth row, the second image sensor configured to generate second visual output signals conveying second visual information within a second portion of the capture field based on light incident on the second array of photosites, the second image sensor generating the second visual output signals sequentially across the second set of rows such that the second visual output signals are generated row by row from the third edge to the fourth edge, wherein the sequential generation of the second visual output signals:

causes the second visual information to be defined by the light incident on the second array of photosites at different times; and defines a second rolling shutter direction for the second portion of the capture field, the second rolling shutter direction indicating a second direction in which the second visual information is defined across the second portion as the function of time;

wherein the first portion is adjacent to the second portion, and the first rolling shutter direction is parallel to and same as the second rolling shutter direction; and one or more physical processors configured by machine-readable instructions to:

obtain a first image based on the first visual information;

obtain a second image based on the second visual information; and generate a stitched image based on the first image and the second image.

2. The system of claim 1, wherein:

the set of image sensors further comprises a third image sensor including a third array of photosites, the third image sensor having a fifth edge and a sixth edge that is opposite of the fifth edge, the third array of photosites having a third set of rows arrayed between the fifth edge and the sixth edge, the third set of rows including a seventh row adjacent to an eight row and a ninth row adjacent to the eight row, the third image sensor configured to generate third visual output signals conveying third visual information within a third portion of the capture field based on light incident on the third array of photosites, the third image sensor generating the third visual output signals sequentially across the third set of rows such that the third visual output signals are generated row by row from the fifth edge to the sixth edge, wherein the sequential generation of the third visual output signals:

causes the third visual information to be defined by the light incident on the third array of photosites at different times; and defines a third rolling shutter direction for the third portion of the capture field, the third rolling shutter direction indicating a third direction in which the third visual information is defined across the third portion as the function of time;

wherein the third portion is adjacent to the first portion and diagonal to the second portion, and the third rolling shutter direction is opposite of the first rolling shutter direction; and the one or more physical processors are further configured by machine-readable instructions to:

obtain a third image based on the third visual information; and generate the stitched image further based on the third image.

3. The system of claim 1, wherein:

the first portion of the capture field includes a first boundary portion and the second portion of the capture field includes a second boundary portion, the first boundary portion adjacent to the second boundary portion; and the sequential generation of the first visual output signals and the sequential generation of the second visual output signals are synchronized in time such that the first visual information within the first boundary portion and the second visual information within the second boundary portion are defined at one or more same moments in time.

4. The system of claim 2, wherein:

the first portion of the capture field includes a third boundary portion and the third portion of the capture field includes a fourth boundary portion, the third boundary portion adjacent to the fourth boundary portion; and the sequential generation of the first visual output signals and the sequential generation of the third visual output signals are synchronized in time such that the first visual information within the third boundary portion and the third visual information within the fourth boundary portion are defined at one or more same moments in time.

5. The system of claim 1, wherein the first portion is adjacent to the second portion based on a right part of the first portion being adjacent to a left part of the second portion, and the first rolling shutter direction is parallel to and same as the second rolling shutter direction along a first boundary between the right part of the first portion and the left part of the second portion.

6. The system of claim 5, wherein the first portion is further adjacent to the second portion based on a top part of the first portion being adjacent to a top part of the second portion, and the first rolling shutter direction is opposite of the second rolling shutter direction along a second boundary between the top part of the first portion and the top part of the second portion.

7. The system of claim 2, wherein the third portion is adjacent to the first portion based on a top part of the third portion being adjacent to a bottom part of the first portion, and the third rolling shutter direction is opposite of the first rolling shutter direction along a third boundary between the top part of the third portion and the bottom part of the first portion.

8. The system of claim 1, wherein the set of image sensors includes eight image sensors.

9. The system of claim 1, wherein the stitched image includes a spherical image, an inverse image, or a three-dimensional reconstruction image.

10. A method for capturing stitched visual content, the method comprising:

generating visual output signals conveying visual information within a capture field of a set of image sensors, the set of image sensors including a first image sensor and a second image sensor, the generation of the visual output signals including:

generating first visual output signals conveying first visual information within a first portion of the capture field based on light incident on a first array of photosites of the first image sensor, the first image sensor having a first edge and a second edge that is opposite of the first edge, the first array of photosites having a first set of rows arrayed between the first edge and the second edge, the first set of rows including a first row adjacent to a second row and a third row adjacent to the second row, the first visual output signals generated sequentially across the first set of rows such that the first visual output signals are generated row by row from the first edge to the second edge, wherein the sequential generation of the first visual output signals:
  causes the first visual information to be defined by the light incident on the first array of photosites at different times; and
  defines a first rolling shutter direction for the first portion of the capture field, the first rolling shutter direction indicating a first direction in which the first visual information is defined across the first portion as a function of time;
generating second visual output signals conveying second visual information within a second portion of the capture field based on light incident on a second array of photosites of the second image sensor, the second image sensor having a third edge and a fourth edge that is opposite of the third edge, the second array of photosites having a second set of rows arrayed between the third edge and the fourth edge, the second set of rows including a fourth row adjacent to a fifth row and a sixth row adjacent to the fifth row, the second visual output signals generated sequentially across the second set of rows such that the second visual output signals are generated row by row from the third edge to the fourth edge, wherein the sequential generation of the second visual output signals:
  causes the second visual information to be defined by the light incident on the second array of photosites at different times; and
  defines a second rolling shutter direction for the second portion of the capture field, the second rolling shutter direction indicating a second direction in which the second visual information is defined across the second portion as the function of time;
wherein the first portion is adjacent to the second portion, and the first rolling shutter direction is parallel to and same as the second rolling shutter direction;
obtaining a first image based on the first visual information;
obtaining a second image based on the second visual information; and
generating a stitched image based on the first image and the second image.

11. The method of claim 10, wherein the set of image sensors further includes a third image sensor, the method further comprising:
  generating third visual output signals conveying third visual information within a third portion of the capture field based on light incident on a third array of photosites of the third image sensor, the third image sensor having a fifth edge and a sixth edge that is opposite of the fifth edge, the third array of photosites having a third set of rows arrayed between the fifth edge and the sixth edge, the third set of rows including a seventh row adjacent to an eight row and a ninth row adjacent to the eight row, the third visual output signals generated sequentially across the third set of rows such that the third visual output signals are generated row by row from the fifth edge to the sixth edge, wherein the sequential generation of the third visual output signals:
    causes the third visual information to be defined by the light incident on the third array of photosites at different times; and
    defines a third rolling shutter direction for the third portion of the capture field, the third rolling shutter direction indicating a third direction in which the third visual information is defined across the third portion as the function of time;
  wherein the third portion is adjacent to the first portion and diagonal to the second portion, and the third rolling shutter direction is opposite of the first rolling shutter direction;
  obtaining a third image based on the third visual information; and
  generating the stitched image further based on the third image.

12. The method of claim 10, wherein:
the first portion of the capture field includes a first boundary portion and the second portion of the capture field includes a second boundary portion, the first boundary portion adjacent to the second boundary portion; and
the sequential generation of the first visual output signals and the sequential generation of the second visual output signals are synchronized in time such that the first visual information within the first boundary portion and the second visual information within the second boundary portion are defined at one or more same moments in time.

13. The method of claim 11, wherein:
the first portion of the capture field includes a third boundary portion and the third portion of the capture field includes a fourth boundary portion, the third boundary portion adjacent to the fourth boundary portion; and
the sequential generation of the first visual output signals and the sequential generation of the third visual output signals are synchronized in time such that the first visual information within the third boundary portion and the third visual information within the fourth boundary portion are defined at one or more same moments in time.

14. The method of claim 10, wherein the first portion is adjacent to the second portion based on a right part of the first portion being adjacent to a left part of the second portion, and the first rolling shutter direction is parallel to and same as the second rolling shutter direction along a first boundary between the right part of the first portion and the left part of the second portion.

15. The method of claim 14, wherein the first portion is further adjacent to the second portion based on a top part of the first portion being adjacent to a top part of the second portion, and the first rolling shutter direction is opposite of the second rolling shutter direction along a second boundary between the top part of the first portion and the top part of the second portion.

16. The method of claim 11, wherein the third portion is adjacent to the first portion based on a top part of the third portion being adjacent to a bottom part of the first portion, and the third rolling shutter direction is opposite of the first rolling shutter direction along a third boundary between the top part of the third portion and the bottom part of the first portion.

17. The method of claim 10, wherein the set of image sensors includes eight image sensors.

18. The method of claim 10, wherein stitched image includes a spherical image, an inverse image, or a three-dimensional reconstruction image.

19. A system for capturing stitched visual content, the system comprising:
  a set of image sensors configured to generate visual output signals conveying visual information within a capture field, the set of image sensors comprising:
    a first image sensor including a first array of photosites, the first image sensor having a first edge and a second edge that is opposite of the first edge, the first array of photosites having a first set of rows arrayed between the first edge and the second edge, the first set of rows including a first row adjacent to a second row and a third row adjacent to the second row, the first image sensor configured to generate first visual output signals conveying first visual information within a first portion of the capture field based on light incident on the first array of photosites, the first image sensor generating the first visual output signals sequentially across the first set of rows such that the first visual output signals are generated row by row from the first edge to the second edge, wherein the sequential generation of the first visual output signals:
      causes the first visual information to be defined by the light incident on the first array of photosites at different times; and
      defines a first rolling shutter direction for the first portion of the capture field, the first rolling shutter direction indicating a first direction in which the first visual information is defined across the first portion as a function of time;
    a second image sensor including a second array of photosites, the second image sensor having a third edge and a fourth edge that is opposite of the third edge, the second array of photosites having a second set of rows arrayed between the third edge and the fourth edge, the second set of rows including a fourth row adjacent to a fifth row and a sixth row adjacent to the fifth row, the second image sensor configured to generate second visual output signals conveying second visual information within a second portion of the capture field based on light incident on the second array of photosites, the second image sensor generating the second visual output signals sequentially across the second set of rows such that the second visual output signals are generated row by row from the third edge to the fourth edge, wherein the sequential generation of the second visual output signals:
      causes the second visual information to be defined by the light incident on the second array of photosites at different times; and
      defines a second rolling shutter direction for the second portion of the capture field, the second rolling shutter direction indicating a second direction in which the second visual information is defined across the second portion as the function of time;
    wherein the first portion is adjacent to the second portion, and the first rolling shutter direction is parallel to and same as the second rolling shutter direction; and
    a third image sensor including a third array of photosites, the third image sensor having a fifth edge and a sixth edge that is opposite of the fifth edge, the third array of photosites having a third set of rows arrayed between the fifth edge and the sixth edge, the third set of rows including a seventh row adjacent to an eight row and a ninth row adjacent to the eight row, the third image sensor configured to generate third visual output signals conveying third visual information within a third portion of the capture field based on light incident on the third array of photosites, the third image sensor generating the third visual output signals sequentially across the third set of rows such that the third visual output signals are generated row by row from the fifth edge to the sixth edge, wherein the sequential generation of the third visual output signals:
      causes the third visual information to be defined by the light incident on the third array of photosites at different times; and
      defines a third rolling shutter direction for the third portion of the capture field, the third rolling shutter direction indicating a third direction in which the third visual information is defined across the third portion as the function of time;
    wherein the third portion is adjacent to the first portion and diagonal to the second portion, and the third rolling shutter direction is opposite of the first rolling shutter direction; and
  one or more physical processors configured by machine-readable instructions to:
    obtain a first image based on the first visual information;
    obtain a second image based on the second visual information;
    obtain a third image based on the third visual information; and
    generate a stitched image based on the first image, the second image, and the third image.

20. The system of claim 19, wherein:
  the first portion of the capture field includes a first boundary portion and the second portion of the capture field includes a second boundary portion, the first boundary portion adjacent to the second boundary portion;
  the first portion of the capture field includes a third boundary portion and the third portion of the capture field includes a fourth boundary portion, the third boundary portion adjacent to the fourth boundary portion;
  the sequential generation of the first visual output signals and the sequential generation of the second visual output signals are synchronized in time such that the first visual information within the first boundary portion and the second visual information within the second boundary portion are defined at one or more first moments in time; and
  the sequential generation of the first visual output signals and the sequential generation of the third visual output signals are synchronized in time such that the first visual information within the third boundary portion and the third visual information within the fourth boundary portion are defined at one or more second moments in time.

* * * * *